(12) United States Patent
Kanehira et al.

(10) Patent No.: US 9,561,570 B2
(45) Date of Patent: Feb. 7, 2017

(54) MACHINE TOOL

(71) Applicant: KOMATSU NTC, LTD., Nanto, Toyama (JP)

(72) Inventors: Yuji Kanehira, Toyama (JP); Nobuhito Oki, Toyama (JP); Yasuo Hasegawa, Toyama (JP); Hisaki Itabashi, Toyama (JP)

(73) Assignee: KOMATSU NTC LTD. (JP)

(*) Notice: Subject to any disclaimer, the term of this patent is extended or adjusted under 35 U.S.C. 154(b) by 114 days.

(21) Appl. No.: 14/436,647

(22) PCT Filed: Nov. 29, 2013

(86) PCT No.: PCT/JP2013/082260
§ 371 (c)(1),
(2) Date: Apr. 17, 2015

(87) PCT Pub. No.: WO2014/084376
PCT Pub. Date: Jun. 5, 2014

(65) Prior Publication Data
US 2015/0266153 A1    Sep. 24, 2015

(30) Foreign Application Priority Data

Nov. 30, 2012  (JP) .................................. 2012-262506

(51) Int. Cl.
*B23Q 3/157* (2006.01)
*B23Q 11/08* (2006.01)
(Continued)

(52) U.S. Cl.
CPC ........... *B23Q 17/0909* (2013.01); *B23Q 3/155* (2013.01); *B23Q 3/1572* (2013.01); *B23Q 11/08* (2013.01);
(Continued)

(58) Field of Classification Search
CPC ............ B23Q 17/0909; B23Q 3/155–3/15793; B23Q 11/08–11/0891; Y10T 483/115; Y10T 483/13–483/138; G05B 2219/37244
(Continued)

(56) References Cited

U.S. PATENT DOCUMENTS 3,930,302 A * 1/1976 Ochiai ............... B23Q 3/15526
483/3
4,404,506 A * 9/1983 Nishimura ........... G05B 19/404
483/10
(Continued)

FOREIGN PATENT DOCUMENTS

CN          102566504 A       7/2012
CN          102680343 A       9/2012
(Continued)

OTHER PUBLICATIONS

Machine translation of EP 1493531, which EP '531 was published Jan. 2005.*

*Primary Examiner* — Erica E Cadugan
(74) *Attorney, Agent, or Firm* — Steven M. Greenberg; CRGO Law

(57) ABSTRACT

A machine tool includes a spindle device; a shutter which is disposed between a tool magazine disposed over a machining chamber and the machining chamber, and is capable of opening and closing; a tool exchange device; and a tool breakage detecting device to detect whether a tool indexed to a tool detecting position of the tool magazine has breakage or not, and performs a return step of returning a first tool to the tool magazine with use of the tool exchange device; an attachment step of attaching a second tool to the spindle device; and a breakage detecting step of rotatively moving the first tool returned to the tool magazine to the tool detecting position and detecting breakage of the first tool with use of the tool breakage detecting device, after the shutter is closed. This constitution can prevent erroneous detection and improve the operational efficiency of the machine tool.

2 Claims, 5 Drawing Sheets

(51) Int. Cl.
*B23Q 17/09* (2006.01)
*B23Q 3/155* (2006.01)

(52) U.S. Cl.
CPC ....... *B23Q 3/15706* (2013.01); *B23Q 3/15766* (2013.01); *B23Q 11/0891* (2013.01); *G05B 2219/37244* (2013.01); *Y10T 483/115* (2015.01); *Y10T 483/136* (2015.01); *Y10T 483/138* (2015.01); *Y10T 483/1795* (2015.01)

(58) Field of Classification Search
USPC .................................................... 483/3, 7–11
See application file for complete search history.

(56) References Cited

U.S. PATENT DOCUMENTS

| | | | | |
|---|---|---|---|---|
| 5,224,916 | A * | 7/1993 | Chang | B23Q 11/08 483/3 |
| 8,562,497 | B2 * | 10/2013 | Tanizaki | B23Q 11/0891 483/3 |
| 2005/0161622 | A1 * | 7/2005 | Bell | B23Q 17/0909 250/493.1 |
| 2007/0004572 | A1 * | 1/2007 | Arai | B23Q 3/1554 483/36 |
| 2010/0145498 | A1 | 6/2010 | Uchikawa et al. | |
| 2013/0331245 | A1 * | 12/2013 | Koike | B23Q 3/15526 483/54 |

FOREIGN PATENT DOCUMENTS

| | | | |
|---|---|---|---|
| EP | 0127751 A1 | * | 12/1984 |
| EP | 1493531 A1 | * | 1/2005 |
| EP | 1674200 A1 | * | 6/2006 |
| GB | 1437145 A | * | 5/1976 |
| JP | 63-053645 U | * | 4/1988 |
| JP | 05-146953 A | | 6/1993 |
| JP | 06-238542 A | | 8/1994 |
| JP | 2000-280139 A | | 10/2000 |
| JP | 2010-131719 A | | 6/2010 |
| JP | 2010-134638 A | | 6/2010 |
| JP | 2011-045947 A1 | * | 3/2011 |
| WO | WO-2015/059806 A1 | * | 4/2015 |
| WO | WO-2015/104945 A1 | * | 7/2015 |

* cited by examiner

MACHINE TOOL

CROSS-REFERENCE TO RELATED APPLICATIONS

This application is a Submission Under 35 U.S.C. §371 for U.S. National Stage Patent Application of International Application Number PCT/JP2013/082260, filed Nov. 29, 2013, and entitled MACHINE TOOL, which is related to and claims priority to Japanese Patent Application Serial Number 2012-262506, filed Nov. 30, 2012.

TECHNICAL FIELD

The present invention relates to a machine tool, specifically, relates to a machine tool provided with a tool breakage detecting device for detecting breakage of a tool returned to a tool magazine.

BACKGROUND ART

Conventionally, there is known a technique to detect breakage of a tool after machining a workpiece in a machining apparatus (for example, patent documents 1 to 3). In the patent document 1, a technique is disclosed, in which technique each of a plurality of detecting devices is disposed on a side position of a corresponding tool of a plurality of tools attached to a multi-spindle head to detect breakage of the tools. In the patent document 2, a technique is disclosed for a tool delivery device for storing a tool attached to a spindle in a tool magazine, in which technique there is provided a linear movement zone on the way of a movement way of the tool, and a tool breakage detecting device is provided in the linear movement zone. In the patent document 3, a detector and a tool approach section for detecting breakage of a tool stored in a tool stocker are disclosed.

PRIOR ART DOCUMENT

Patent Document

Patent document 1: Japanese Patent Laid-Open Publication No. H05-146953 (paragraph 0011, FIG. 3)
Patent document 2: Japanese Patent Laid-Open Publication No. 2000-280139 (claim 1, paragraph 0028, FIGS. 1 to 4)
Patent document 3: Japanese Patent Laid-Open Publication No. 2010-131719 (paragraph 0011, FIG. 3)

SUMMARY OF THE INVENTION

Problems to be Solved by the Invention

However, in the tool breakage detecting devices described in the patent document 1, a corresponding tool breakage detecting device (contact switch, contactor) is provided for each of the tools, so that there have been problems that the number of parts is increased because of the complexity of the constitution and man-hours is also increased because adjustment of the tool breakage detecting devices is complex.

In the tool breakage detecting device described in the patent document 2, the detecting of breakage of a tool is performed on the way where the tool having been attached to the spindle is returned to the tool magazine, so that there have been problems that the number of parts is increased because of the complexity of the constitution and the time required for detecting breakage of a tool depresses the operation time of the machine tool.

In the tool breakage detecting device described in the patent document 3, a shutter to separate the tool stocker from a machining chamber is not provided. So, in a case where the detecting of the breakage is performed, for example, during machining, coolant, chips, or the like is scattered to the tool stocker from the machining chamber, so that the coolant or the like floats in the environment of the detecting. Therefore, there is a risk that erroneous detection might be caused. And in a case where the detecting of the breakage is performed while, after the tool is stocked in the tool stocker, the following process machining is performed with another tool, if the tool used in the preceding process is broken, a trouble occurs in the following process, so that a sequential breakage of the tools may be induced.

The present invention is created to solve such problems, and it is an object of the present invention to provide a machine tool provided with a tool breakage detecting device capable of improving the operational efficiency while preventing erroneous detection by improving the detecting accuracy.

Means for Solving the Problem

The present invention provides a machine tool, comprising:

a spindle device which a tool to machine a workpiece is attached to;

a machining chamber to cover a machining zone to machine the workpiece with use of the tool;

a tool magazine which is disposed over the machining chamber, stores a plurality of tools, and is a rotational disc type magazine;

a shutter which is disposed between the tool magazine and the machining chamber, and is capable of opening and closing;

a tool exchange device to exchange the tool attached to the spindle device for a tool stored in the tool magazine;

a tool breakage detecting device to detect whether a tool indexed to a tool detecting position of the tool magazine has breakage or not; and a controller to control operations of the spindle device, the tool exchange device, and the tool breakage detecting device, wherein the controller performs a return step of returning a first tool attached to the spindle device and used in the preceding process to the tool magazine;

an attachment step of receiving a second tool to be used in the following process from the tool magazine and attaching the second tool to the spindle device; and a breakage detecting step of rotatively moving the first tool returned to the tool magazine to the tool detecting position and detecting breakage of the first tool with use of the tool breakage detecting device, after the shutter is closed.

The machine tool according to claim 1 of the present invention detects breakage of a tool in a closed state of the shutter with use of the tool breakage detecting device, so that the machine tool is capable of preventing coolant, chips, and/or the like from entering the tool magazine from the machining chamber even during machining a workpiece while jetting the coolant thereto. That is, coolant and/or the like can be prevented from staying around the tool magazine to detect breakage of a tool to avoid erroneous detection.

There is provided the tool breakage detecting device to detect whether a tool indexed to the tool detecting position of the tool magazine has breakage or not, so that a tool breakage detecting device is not needed to be disposed for each tool stored in the tool magazine. Therefore, the constitution can be simplified.

Thus, as the tool machine according to the present invention includes the tool breakage detecting device, erroneous detection can be prevented and a detecting accuracy can be improved even during machining a workpiece. And as breakage of a tool stored in the tool magazine is detected during machining a workpiece, the operational efficiency can be improved.

The invention according to claim 2 of the present invention provides the machine tool according to claim 1, wherein the controller judges whether a portion of the workpiece to be machined with the first tool is the same portion as a portion to be machined with the second tool or not, and wherein in a case of the same portion, the controller gives an instruction to perform machining the workpiece with use of the second tool attached to the spindle device after the controller confirms that the first tool has not breakage in the breakage detecting step.

According to this constitution, in a case where a portion of the workpiece to be machined with the first tool is the same portion as a portion to be machined with the second tool, as machining the workpiece with use of the second tool is performed after confirming that the first tool has not breakage, a successive damage of the second tool (reamer, tap) in the following process to be caused by the breakage of the first tool (drill) used in the preceding process (prepared hole machining) can be prevented, so that the operational efficiency of the machine tool can be improved.

The invention according to claim 3 of the present invention provides the machine tool according to claim 1, wherein the controller judges whether a portion of the workpiece to be machined with the first tool is the same portion as a portion to be machined with the second tool or not, and wherein in a case of non-same portion, the controller performs the breakage detecting step after the controller gives an instruction to perform machining the workpiece with use of the second tool.

According to this constitution, in a case where the portions are different from each other, as the breakage detecting step is performed during machining the workpiece with use of the second tool in the following step, the operational efficiency of the machine tool can be improved.

Effect of the Invention

The tool breakage detecting device according to the present invention can improve the operational efficiency of the machine tool while improving the detecting accuracy and preventing erroneous detection.

BRIEF DESCRIPTION OF THE DRAWINGS

FIGS. 3 A to 3C are views to explain an operation of the machine tool provided with the tool breakage detecting device according to the embodiment of the present invention.

FIG. 4A is a view showing a first tool is returned;

FIG. 4B is a view showing a second tool is dispensed;

FIG. 4C is a view showing completion of moving of the first tool for a breakage detecting;

FIG. 4D is a view showing retreat of the optical sensor;

FIG. 4E is a view showing completion of the preparation of an ATC operation for returning the second tool.

MODE FOR CARRYING OUT THE INVENTION

A horizontal machining center 100, which is a machine tool provided with a tool breakage detecting device 1 according to the embodiment of the present invention, will be explained in detail appropriately with reference to Figures.

Figure 1:
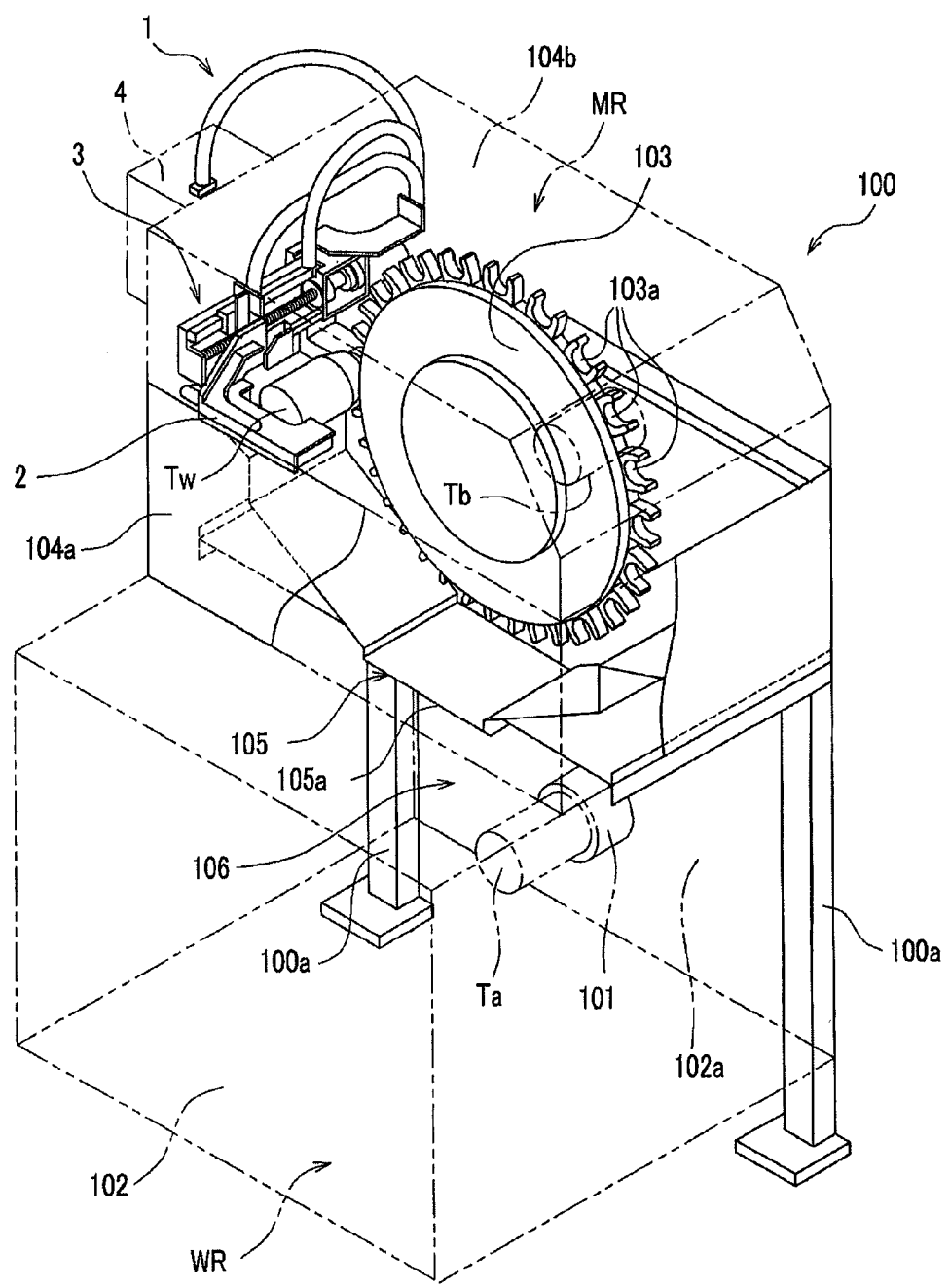
FIG. 1 is a perspective view showing a constitution of a horizontal machining center provided with a tool breakage detecting device according to an embodiment of the present invention.

As shown in FIG. 1, the horizontal machining center 100 provided with the tool breakage detecting device 1 includes frames 100a, a spindle device 101, a machining chamber WR, a machining chamber cover 102, a tool magazine 103, a magazine cover 104a, a shutter device 105, a tool exchange device 106, the tool breakage detecting device 1, and a controller 4. The frames 100a are standing on a bed not shown. A tool Ta is attached to the spindle 101. The machining chamber WR defines a machining zone. The machining chamber cover 102 covers the machining zone to form the machining chamber WR. The tool magazine 103 is a rotational disc type one which stores a large number of tools Tb, and is disposed over the machining chamber WR. The magazine cover 104a covers the tool magazine 103. The shutter device 105 opens or closes a shutter 105a disposed between the tool magazine 103 and the machining chamber WR. The tool exchange device 106 exchanges the tool Ta attached to the spindle device 101 for a tool Tb stored in the tool magazine 103. The tool breakage detecting device 1 detects the presence or absence of breakage of a tool. The controller 4 controls operations of the spindle 101, the shutter device 105, the tool exchange device 106, and the tool breakage detecting device 1.

Note that, the tool breakage detecting device 1 is applied to the horizontal machining center 100 in the present embodiment, but is not limited to this. That is, the tool breakage detecting device 1 can be applied to various machine tools like a vertical machining center or a transfer machine. For this reason, the constitution of the horizontal machining center 100 is not specifically limited. So in FIG. 1, only structural elements necessary for the explanation are shown, and the other elements are not shown and explanations of those are omitted. Furthermore, in FIG. 1, a magazine chamber MR is shown in a scale larger than the machining chamber WR for convenience of the explanation.

The spindle device 101 is a device to rotate the tool Ta attached to the front end portion of the spindle device, and is configured to be capable of freely moving, for example, in a left-right direction (X-axis direction), in an upper-lower direction (Y-axis direction), and in a front-rear direction (Z-axis direction). And a workpiece (not shown), which is clamped in the machining chamber WR, is machined with the tool Ta in a state where the front end portion of the spindle device 101 is positioned in the machining chamber WR.

In some cases, a tool which is used in the horizontal machining center 100 is designated like a tool Ta or a tool Tb so that they are made a distinction between them, but in a case of no necessity of specific distinction, the tool is designated as a tool T in some cases. The tool T is the generic name including a plurality of tools Tb stored in the tool magazine 103, the tool Ta attached to the spindle device 101, and a tool Tw to be detected at a tool detecting position.

The machining chamber WR is the machining zone for a workpiece, which zone is defined by the machining chamber cover 102 so that the coolant, chips, or the like is not scattered during machining. The front portion of the spindle device 101 advances into, and is disposed in the machining chamber WR through a rear cover 102a of the machining chamber cover 102. The rear cover 102a of the machining chamber cover 102 is formed of a shielding member capable of freely following like bellows so that the spindle device 101 is capable of freely moving.

The tool magazine 103 is a device for storing a large number of tools T (Tb, Tw) to be attached to the spindle device 101, and a plurality of holding claws 103a for holding the tools T are disposed along the circumference of the tool magazine 103. Each of the holding claws 103a has holding force by a spring (not shown) in a direction to hold a tool T. So the tool T is inserted therein to be held in the holding claw 103a and the tool T being held is drawn out to be released.

The magazine cover 104a is a case which covers the tool magazine 103 to accommodate it, and define the magazine chamber MR so that chips, scale, or the like does not adhere onto the tool magazine 103 or onto the tools Tb or the like stored in the tool magazine 103. The shutter 105a which is capable of opening and closing is attached to the lower portion of the magazine cover 104a, and a dust-protection hood 104b is disposed on the upper portion of the magazine cover 104a.

Figure 3A:
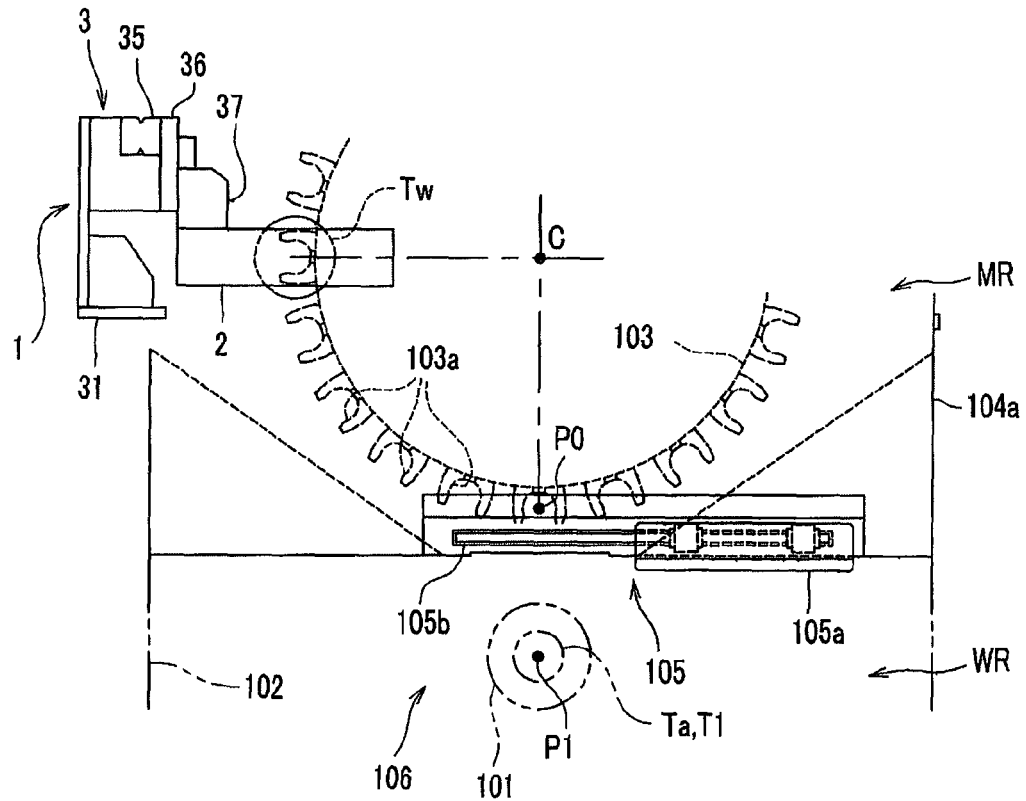
FIG. 3A is a partial front view of an peripheral zone of a tool magazine.
Figure 3B:
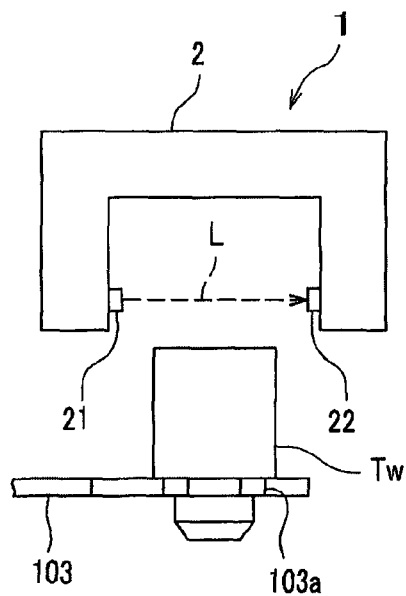
FIG. 3B is a plan view showing a state before moving of an optical sensor.

As shown in FIG. 1, the shutter device 105 is a device to partition off the magazine chamber MR from the machining chamber WR with the shutter 105a, which device is capable of opening and closing. As shown in FIG. 3A, the shutter device 105 includes the slidable shutter 105a disposed in an opening at the lower portion of the magazine cover 104a, a linear guide mechanism 105b to guide the shutter 105a slidably in a horizontal direction, and an air cylinder (not shown) which is an actuator to move the shutter 105a slidably. The air cylinder is disposed behind the magazine cover 104a so that coolant or the like does not adhere thereto. Since the air cylinder can be also disposed in the magazine chamber MR with dustproof countermeasures, the position is not limited thereto. So a detailed description is omitted.

According to this constitution, the shutter device 105 is configured so that the magazine chamber MR and the machining chamber WR are conducted to each other by opening the shutter 105a when the tool exchange device 106 exchanges the tool Ta, and the magazine chamber MR and the machining chamber WR are isolated to each other by closing the shutter 105a when machining is done in the machining chamber WR.

Hereby, the shutter device 105 prevent coolant or the like from entering the magazine chamber MR from the machining room WR even during machining, to restrain the coolant or the like from staying in the magazine chamber MR to detect breakage of a tool. Thus, erroneous detection with use of the tool breakage detecting device 1 can be prevented.

The tool exchange device 106 is a device to exchange a tool T attached to the spindle device 101 for some other tool T, has various types, and is not particularly limited. In this embodiment, the tool T is exchanged by moving the spindle device 101 with use of a movement device (not shown) for the spindle device 101.

<ATC Operation>

Figure 4A:
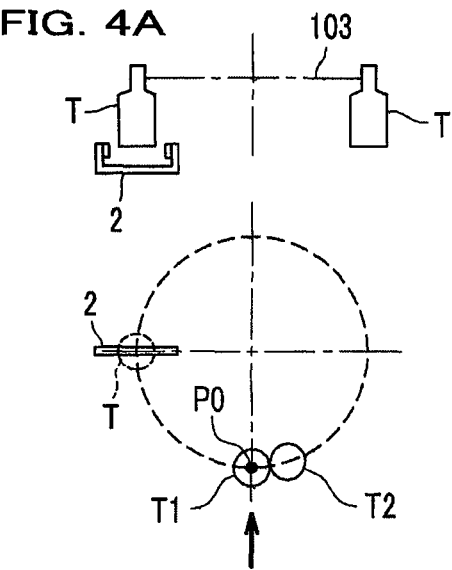
FIGS. 4A to 4E are process views to explain the operation of the machine tool provided with the tool breakage detecting device according to the embodiment of the present invention.
Figure 4B:
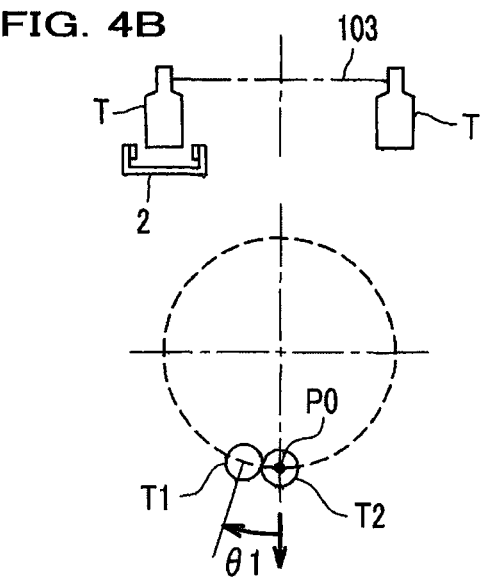

An operation (ATC operation) of the tool exchange device 106 will be described with reference to FIGS. 3A, 4A, 4B. FIG. 3A is a front view showing a tool exchange wait position P1 in the ATC operation. The tool exchange wait position P1 of the spindle device 101 is a position just under a central axis C of the tool magazine 103, and is in a state where the shutter 105a is opened. The tool Ta (T1) is exchanged between the spindle device 101 and the tool magazine 103 at a position (tool exchange position P0) where the spindle device 101 has been moved upward from the tool exchange wait position P1. FIGS. 4A and 4B are schematic front views showing the ATC operation.

The ATC operation includes a step (refer to FIG. 4A) of returning a tool to the tool magazine in which the first tool T1 used in the preceding process in the state attached to the spindle device 101 is stored in the tool magazine 103, and a step (refer to FIG. 4B) of selecting a second tool T2 to be used in the following process out of the tool magazine 103, to attach the tool T2 to the spindle device 101.

<Return Step of Returning First Tool to Tool Magazine>

When the tool Ta (T1) attached to the spindle device 101 is returned to the tool magazine 103, as shown in FIG. 3A, in a state where the shutter 105a is opened, the spindle device 101 is moved to the upper tool exchange position P0 from the tool exchange wait position P1 of the spindle device 101, and then the first tool T1 used in the preceding process in the state attached to the spindle device 101 is inserted into an empty holding claw 103a positioned at the tool exchange position P0 of the tool magazine 103 (refer to FIG. 4A), then the first tool T1 is unclamped with use of a clamping unit (not shown) disposed in the spindle device 101, and then the spindle device 101 is moved backward, so that the first tool T1 is returned to the tool magazine 103.

<Attachment Step of Attaching Second Tool to Spindle Device>

When the second tool T2 which has been stored in the tool magazine 103 and is used in the following process is attached to the spindle device 101, the second tool T2 is rotated in the clockwise direction by θ1 degrees from the position shown in FIG. 4A, so that the tool T2 is indexed to the tool exchange position P0 (position just under the central axis of the tool magazine) of the tool magazine 103 (refer to FIG. 4B).

Then the empty spindle device 101 with no tool T is advanced, and then the second tool T2 disposed at the tool exchange position P0 of the tool magazine 103 is inserted in the spindle device 101, then the second tool T2 is attached to the spindle device 101 while clamping the second tool T2 with use of the clamping unit (not shown) disposed in the spindle device 101, and then the spindle device 101 is moved downward from the tool exchange position P0.

Figure 2:
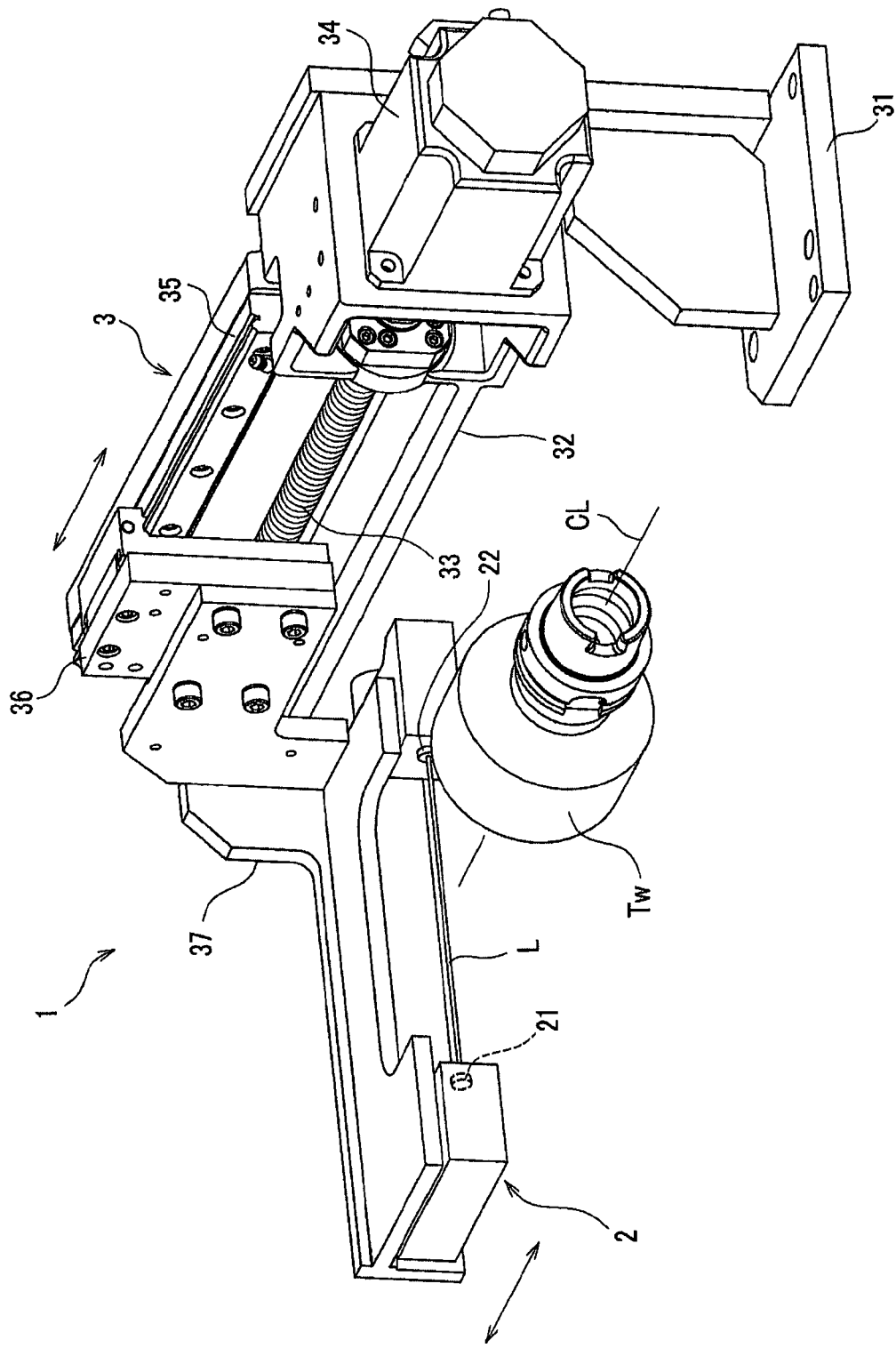
FIG. 2 is a partial perspective view viewed from the rear side of FIG. 1 and showing a constitution of a detecting unit and a moving unit of the tool breakage detecting device according to the embodiment of the present invention.

The tool breakage detecting device 1, as shown in FIG. 2, includes an optical sensor 2 which is a detecting unit to detect presence or absence of breakage of a tool Tw to be detected (refer to FIGS. 1, 3A), and a movement unit 3 to move the optical sensor 2 along the axis line of the tool Tw to be detected positioned at a tool detecting position Tw (position shown in FIGS. 1 and 3A).

As shown in FIG. 3A, the tool Tw to be detected is an objective tool, breakage of which is detected with use of the tool breakage detecting device 1, and is a tool positioned just beside the rotational center C, which position is a position rotated by 90 degrees in the clockwise direction from the position just under the rotational center C, which position is the tool exchange position P0 of the tool magazine 103 (refer to also FIG. 1).

Figure 3C:
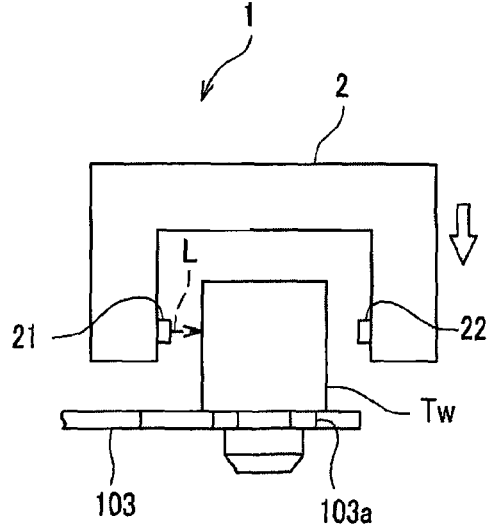
FIG. 3C is a plan view showing completion of the detecting after the moving of the optical sensor.

As shown in FIG. 2, the optical sensor 2 includes a light emitting portion 21 to emit detection light L, a light detecting portion 22 to receive to detect the detection light L which has been emitted, and a judgment unit (not shown) to judge whether the detection light L has been received by the light detecting portion 22 or not. The judgment unit is constituted by a memory device, a calculation device, a light detecting circuit, and the like. And the judgment unit is capable of judging presence or absence of breakage of the tool Tw to be detected by comparing data (a length, a diameter, and the like of the tool) of the tool Tw to be detected in the state (refer to FIG. 3C) where the detection light L emitted from the light emitting portion 21 is shielded by the tool Tw to be detected with data of the tool Tw to be detected in the normal state stored in advance.

Note that, the optical sensor 2 of a noncontact type is employed in this embodiment, but the detecting unit is not limited to this. A contact type detecting unit may be also employed, which unit detects breakage of the tool by contacting of a contactor with the tool.

The movement unit 3 is a unit to move the optical sensor 2 (the light emitting portion 21 and the light detecting portion 22) along the axis line CL of the tool Tw to be detected with so-called feed screw mechanism. And the movement unit 3 includes a supporting bracket 31 placed on the frame 100a (refer to FIG. 1) of the horizontal machining center 100, a base member 32 supported by the supporting bracket 31, a feed screw 33 rotatively supported by the base member 32, a motor 34 to drive the feed screw 33, a nut (not shown) engaged with the feed screw 33, a linear guide mechanism 35 disposed in parallel with the feed screw 33, a saddle 36 to connect the nut and the linear guide mechanism 35, a sensor bracket 37 fixed to the saddle 36 and to fix the optical sensor 2, and a position detecting unit (not shown) to detect a position of the optical sensor 2 by detecting an amount of movement, a change of magnetism, or the like.

According to this constitution, the movement unit 3 is configured to control a rotation of the motor 34 to convert a rotation of the feed screw 33 to a linear movement of the saddle 36 according to control of the controller 4 (refer to FIG. 1), so that a current position of the optical sensor 2 can be detected while an amount of the movement of the optical sensor is controlled.

The controller 4 (refer to FIG. 1) is constituted by electronic circuits of a memory unit, a calculation unit, an information processor, and the like, and is a controller to control operations of the spindle device 101, the shutter device 105, the tool exchange device 106, and the tool breakage detecting device 1.

Figure 4C:
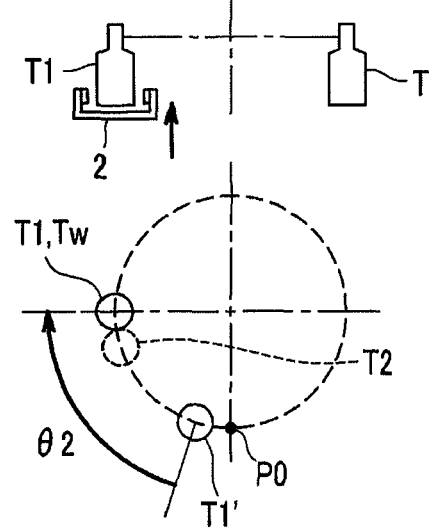
Figure 5:
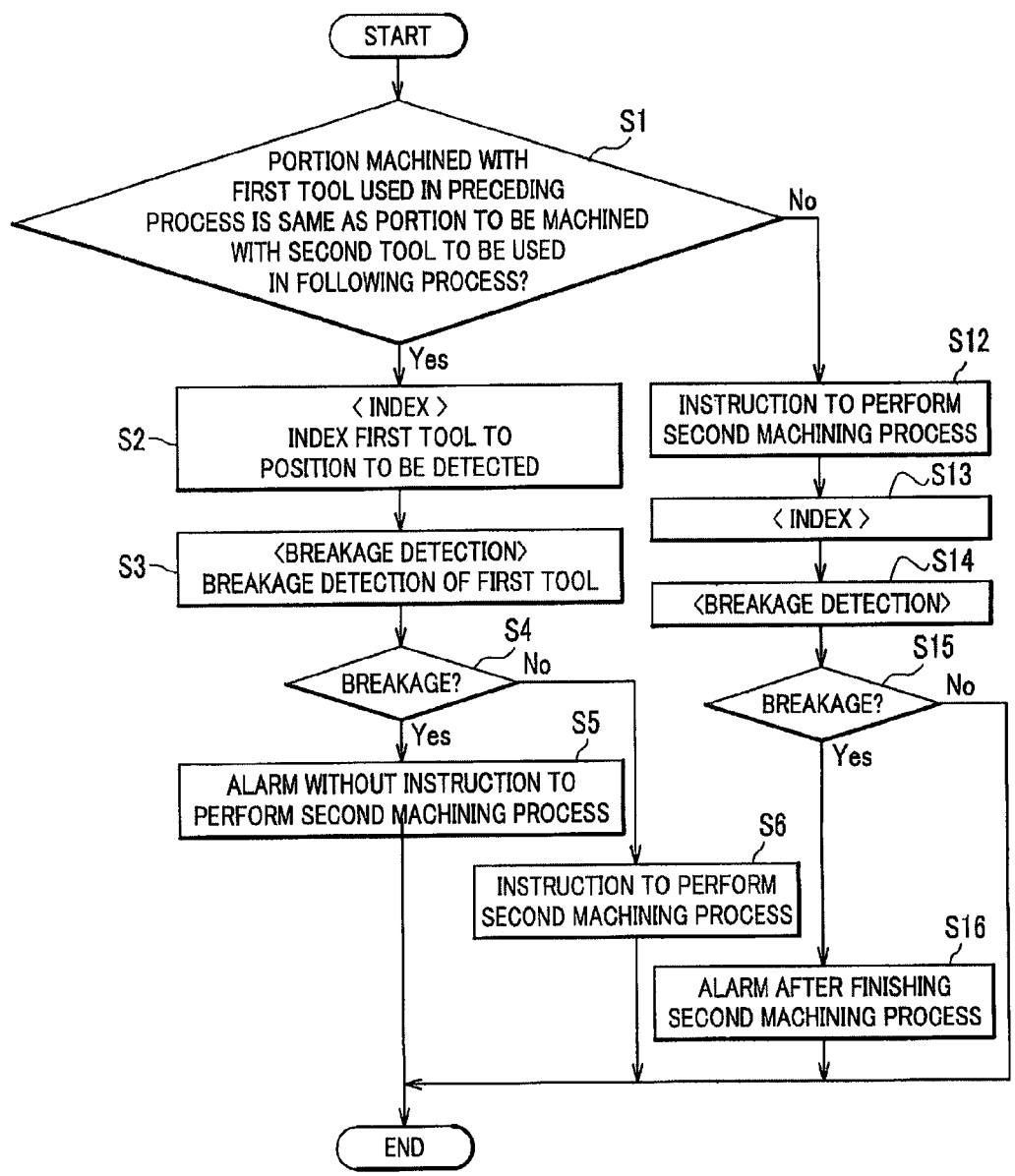
FIG. 5 is a flowing chart showing the operation of the machine tool provided with the tool breakage detecting device according to the embodiment of the present invention.

Next, an operation of the horizontal machining center 100 equipped with the tool breakage detecting device 1 will be described mainly with reference to FIGS. 4C and 5. FIG. 4C is a schematic front view showing an operation of a detecting breakage step. FIG. 5 is a flow chart showing an operation of the horizontal machining center.

Note that, in FIG. 4, for example, when the tool T2 is out and the holding claw 103a is empty, the tool T2 is shown by a broken line and the reference symbol is "T2'". Furthermore, when it is shown that the tool T1 is moved by rotating the tool magazine 103, the tool is shown by T1' before the movement, and by T1 after the movement.

As shown in the left side of FIG. 5, in the horizontal machining center 100, the controller 4 (refer to FIG. 1) judges whether a portion machined with the first tool T1 (preceding process) is the same portion as a portion to be machined with the second tool T2 (following process) or not (S1), in the case of the same portion (Yes in S1), the detecting breakage step is performed (S3).

On the other hand, as shown in the right side of FIG. 5, in the case of non-same portion (No in S1), the detecting breakage step is performed (S14) after an instruction to perform machining the workpiece with the second tool T2 is given (S12).

<Breakage Detecting Step>

The returning step (refer to FIG. 4A) of returning the first tool T1 used in the first machining process which is a preceding process to the tool magazine 103, and the attaching step (refer to FIG. 4B) of attaching the second tool T2 to be used in the second machining process which is a following process to the spindle device 101 are performed with use of the tool exchange device 106, and then the breakage detecting step is performed in a closed state of the shutter 105a. Then it is detected whether the first tool T1 returned to the tool magazine 103 has breakage or not (refer to FIG. 4C).

As shown in FIGS. 4C and 5, the breakage detecting step includes an index process (S2, S13) and a detecting process (S3, S14). The index process is a process to move the first tool T1 which is a tool to be detected to the tool detecting position (refer to the tool Tw to be detected shown in FIG. 1). The detecting process is a process to detect whether the first tool T1 indexed to the tool detecting position Tw to be detected has breakage or not.

The index process (S2, S13) is a process in which in the closed state of the shutter 105a, the first tool T1 is rotated clockwise by θ2 degrees to index the first tool to the tool detecting position from the position shown in FIG. 4B (refer to FIG. 4C).

The detecting process (S3, S14) is a process in which as shown in FIG. 4C, the judgment unit judges whether the tool T1 has breakage or not on the basis of a state where the light emitting portion 21 (refer to FIG. 2) emits the detection light L and the light detecting portion 22 receives the detection light L while the optical sensor 2 moves along the axis line CL of the first tool T1 (tool Tw to be detected) according to the operation of the movement unit 3 (refer to FIG. 2).

<Case of Same Portion>

As shown in the left side of FIG. 5, in the horizontal machining center 100, it is judged whether a portion machined with the first tool T1 (preceding process) is the same portion as a portion to be machined with the second tool T2 (following process) or not (S1), then in the case of the same portion (Yes in S1) and in the case where it is judged that the first tool T1 has breakage in the breakage detecting step (S2~S3) (Yes in S4), an instruction to perform the second machining process is not given, and the operation of the horizontal machining center 100 (refer to FIG. 1) is stopped to alarm a process manager with use of a buzzer, a display lamp, or the like (S5).

On the other hand, in the case where it is judged in the breakage detecting step (S2~S3) that the first tool T1 has not breakage (No in S4), the controller 4 (refer to FIG. 1) gives an instruction to perform the second machining process with use of the second tool T2 attached to the spindle device 101 (S6).

<Case of Non-Same Portion>

As shown in the right side of FIG. 5, in the case where a portion machined with the first tool T1 (preceding process) is not the same portion as a portion to be machined with the second tool T2 (following process) (No in S1), after an instruction to perform machining the workpiece with use of the second tool T2 is given (S12), the breakage detecting step is performed (S13~S14), and then in the case where it is judged in the breakage detecting step (S13~S14) that the first tool T1 has breakage (Yes in S15), after finishing the second machining process, the process manager is alarmed with use of a buzzer, a display lamp, or the like (S16). On the other hand, in the case where it is judged in the breakage detecting step (S3) that the first tool T1 has not breakage (No in S15), the breakage detecting step is ended.

<Advanced Operation for Returning Second Tool T2>

Next, the horizontal machining center 100 is shifted to an advanced operation for returning the second tool T2 to exchange the second tool for a third tool T3 to be used in the following process (refer to FIGS. 4D and 4E).

Figure 4D:
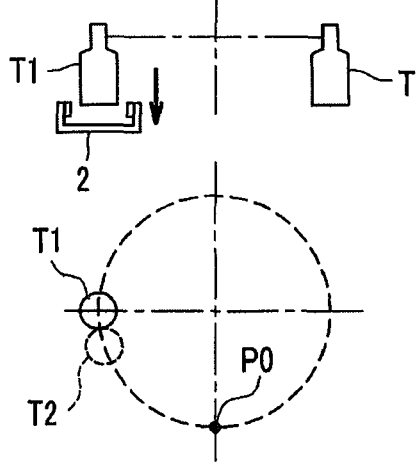
Figure 4E:
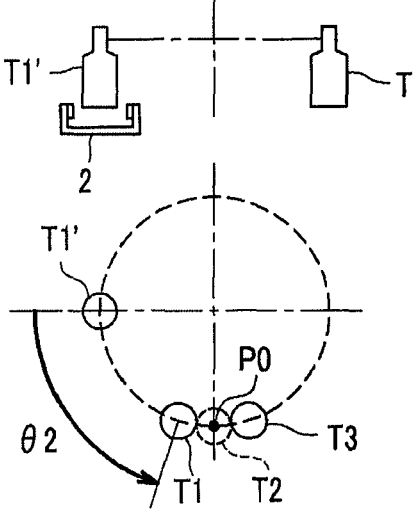

The advanced operation for returning the second tool T2 is an operation to index the empty holding claw 103a (refer to FIG. 1) which the second tool T2 has been out of, to the tool exchange position P0 of the tool magazine 103 by rotating the empty holding claw 103a counterclockwise by θ2 degrees from the position shown in FIG. 4D (refer to FIG. 4E).

According to the above-mentioned constitution, the tool breakage detecting device 1 according to the embodiment of the present invention has the following operational advantages.

In the case where a portion to be machined with the first tool T1 (preceding process) is the same portion as a portion to be machined with the second tool T2 (following process) (Yes in S1), after finishing the first machining process, the tool breakage detecting device 1 detects absence of breakage of the tool T1, and the second machining process is performed with use of the second tool T2 (S4 to S6). Therefore, a successive damage of the second tool T2 (reamer, tap) in the following process to be caused by breakage of the first tool T1 (drill) used in the preceding process (prepared hole machining) can be prevented.

In other words, if the detection of breakage of the first tool T1 is performed during machining in the following process with use of the second tool T2 after the first tool T1 is stored in the tool magazine 103, in the case of presence of breakage of the first tool T1, an excessive load might act on the second tool T2 to induce a successive damage of the second tool T2 because there might remain a portion not yet machined in the preceding process, or there might remain a broken piece of the first tool T1. Therefore, the present invention confirms there is no breakage on the first tool T1.

On the other hand, in the case where a portion to be machined with the first tool T1 (preceding process) is not the same portion as a portion to be machined with the second tool T2 (following process) (No in S1), the breakage detecting step is performed (S13~S14) after an instruction to perform machining the workpiece with use of the second tool T2 is given (S12). Therefore, it can be confirmed during the second machining process whether the first tool T1 has breakage in the first machining process or not, so that the operational efficiency of the horizontal machining center 100 can be further improved.

In the above, the embodiment of the present invention has been described. But the present invention is not limited to this, and the present invention can be properly modified to be carried out.

For example, in the tool breakage detecting device 1 of the embodiment of the present invention, there is provided the movement unit 3 which moves the optical sensor 2 along the axial line of the tool Tw to be detected. However, it is not limited thereto. Optical sensors 2 can be disposed at a plurality of positions along the axial line of the tool Tw to be detected. Furthermore, the optical sensor 2 to detect breakage of a tool is disposed at a position in the horizontal direction through the central axis of the tool magazine 103, but is not limited to this. The optical sensor 2 can be disposed at a position higher than the position in the horizontal direction, and a position of the optical sensor 2 can be properly set according to a shape or the like of the tool magazine.

DESCRIPTION OF THE SYMBOLS

1 Tool breakage detecting device
2 Optical sensor (Detecting unit)
3 Movement unit
4 Controller
100 Machine tool
100 Horizontal machining center (Machine tool)
101 Spindle device
102 Machining chamber cover
103 Tool magazine
103a Holding claw
104a Magazine cover
105 Shutter device
105a Shutter
105b Linear guide mechanism
106 Tool exchange device
CL Axis line
MR Magazine chamber
T1 First tool
T2 Second tool
Tw Tool to be detected
WR Machining chamber

The invention claimed is:

1. A machine tool, comprising:
a spindle device which a tool to machine a workpiece is attached to;
a machining chamber cover to cover a machining zone in which machining of the workpiece occurs with use of the tool attached to the spindle device;
a tool magazine which is disposed over the machining chamber cover, stores a plurality of tools, and is a rotational disc type magazine;
a shutter which is disposed between the tool magazine and the machining chamber cover, and is capable of opening and closing;
a tool breakage detecting device to detect whether a tool indexed to a tool detecting position of the tool magazine has breakage or not; and
a controller to control operations of the spindle device and the tool breakage detecting device, wherein the controller performs a return step of returning a first tool attached to the spindle device and used in a preceding machining process to the tool magazine;

an attachment step of receiving a second tool to be used in a following machining process from the tool magazine and attaching the second tool to the spindle device; and a breakage detecting step of rotatively moving the first tool returned to the tool magazine to the tool detecting position and detecting breakage of the first tool with use of the tool breakage detecting device, after the shutter is closed, wherein the controller judges whether a portion of the workpiece to be machined with the first tool is the same portion as a portion to be machined with the second tool or not, and wherein in a case of the same portion, the controller gives an instruction to perform machining of the workpiece with use of the second tool attached to the spindle device after the controller confirms that the first tool has no breakage in the breakage detecting step.

2. A machine tool, comprising:

a spindle device which a tool to machine a workpiece is attached to;

a machining chamber cover to cover a machining zone in which machining of the workpiece occurs with use of the tool attached to the spindle device;

a tool magazine which is disposed over the machining chamber cover, stores a plurality of tools, and is a rotational disc type magazine;

a shutter which is disposed between the tool magazine and the machining chamber cover, and is capable of opening and closing;

a tool breakage detecting device to detect whether a tool indexed to a tool detecting position of the tool magazine has breakage or not; and a controller to control operations of the spindle device and the tool breakage detecting device, wherein the controller performs a return step of returning a first tool attached to the spindle device and used in a preceding machining process to the tool magazine;

an attachment step of receiving a second tool to be used in a following machining process from the tool magazine and attaching the second tool to the spindle device; and a breakage detecting step of rotatively moving the first tool returned to the tool magazine to the tool detecting position and detecting breakage of the first tool with use of the tool breakage detecting device, after the shutter is closed, wherein the controller judges whether a portion of the workpiece to be machined with the first tool is the same portion as a portion to be machined with the second tool or not, and wherein in a case of non-same portion, the controller gives an instruction to the tool breakage detecting device to perform the breakage detecting step after the controller gives an instruction to perform machining of the workpiece with use of the second tool.

* * * * *